United States Patent
Watanabe

(10) Patent No.: US 9,641,758 B2
(45) Date of Patent: May 2, 2017

(54) IMAGE BLUR CORRECTION APPARATUS, LENS APPARATUS, IMAGE PICKUP APPARATUS, METHOD OF CONTROLLING IMAGE BLUR CORRECTION APPARATUS, AND NON-TRANSITORY COMPUTER-READABLE STORAGE MEDIUM

(71) Applicant: CANON KABUSHIKI KAISHA, Tokyo (JP)

(72) Inventor: Takeshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/492,300

(22) Filed: Sep. 22, 2014

(65) Prior Publication Data

US 2015/0097977 A1   Apr. 9, 2015

(30) Foreign Application Priority Data

Oct. 9, 2013   (JP) .................................. 2013-211620

(51) Int. Cl.
*H04N 5/232*   (2006.01)

(52) U.S. Cl.
CPC ..... *H04N 5/23287* (2013.01); *H04N 5/23258* (2013.01)

(58) Field of Classification Search
CPC .................. H04N 5/23287; H04N 5/23258
See application file for complete search history.

(56) References Cited

U.S. PATENT DOCUMENTS

| | | | | |
|---|---|---|---|---|
| 5,376,993 | A * | 12/1994 | Kubota | .............. H04N 5/23248 348/208.11 |
| 5,974,269 | A | 10/1999 | Sato et al. | |
| 6,035,134 | A | 3/2000 | Sato et al. | |
| 6,327,433 | B1 | 12/2001 | Ishikawa et al. | |
| 2010/0118402 | A1* | 5/2010 | Washisu | .............. G02B 27/646 359/557 |
| 2011/0194847 | A1* | 8/2011 | Wakamatsu | .............. G03B 5/00 396/55 |

FOREIGN PATENT DOCUMENTS

JP   2002-250952 A   9/2002

* cited by examiner

*Primary Examiner* — Christopher K Peterson
(74) *Attorney, Agent, or Firm* — Fitzpatrick, Cella, Harper & Scinto

(57) ABSTRACT

An image blur correction apparatus includes a vibration detection unit configured to detect vibration information of the image blur correction apparatus to output a vibration signal, a signal separation unit configured to separate the vibration signal into a first vibration signal and a second vibration signal, a first sensitivity correction unit configured to correct an amplitude of the first vibration signal, a second sensitivity correction unit configured to correct an amplitude of the second vibration signal, a first drive unit configured to drive the first optical correction unit based on an output signal from the first sensitivity correction unit, and a second drive unit configured to drive the second optical correction unit based on an output signal from the second sensitivity correction unit.

18 Claims, 8 Drawing Sheets

IMAGE BLUR CORRECTION APPARATUS, LENS APPARATUS, IMAGE PICKUP APPARATUS, METHOD OF CONTROLLING IMAGE BLUR CORRECTION APPARATUS, AND NON-TRANSITORY COMPUTER-READABLE STORAGE MEDIUM

BACKGROUND OF THE INVENTION

Field of the Invention

The present invention relates to an image blur correction apparatus which uses a plurality of correction optical systems to correct an image blur.

Description of the Related Art

Conventionally, image pickup apparatuses have been known which use two correction optical systems to correct an image blur. Such an image pickup apparatus has been increasingly required to be capable of performing high-magnification zooming in which a focal length largely varies. In optical image blur correction, where a ratio between a displacement of each correction optical system and that of an image is referred to as an "eccentricity sensitivity k", the eccentricity sensitivity k is represented by a function containing a focal length f and a photographing magnification β. A displacement dL of each correction optical system is represented by the following Expression (1) by using the eccentricity sensitivity k and a correction angle θ.

$$dL = k(f,\beta) \times \theta \quad (1)$$

As can be seen from Expression (1), since the displacement dL of the correction optical system varies depending on the focal length f, it is difficult for a zoom lens whose focal length greatly varies to be capable of, both at a telephoto side and a wide-angle side, ensuring a sufficient correction range and providing a satisfactory control resolution and tracking performance.

Japanese Patent Laid-Open No. ("JP") 2002-250952 discloses an image blur correction apparatus including two correction optical systems with eccentricity sensitivities different from each other and providing a sufficient image blur correction effect both at the telephoto side and the wide-angle side by switching the correction optical system used for image blur correction depending on a focal length of a lens.

However, since the image blur correction apparatus disclosed in JP 2002-250952 has a configuration intended for still image shooting, the apparatus has the following problem when applied to motion image shooting. That is, image blur correction in the still image shooting primarily aims to correct a vibration which occurs in exposure to reduce a blur in a captured image, which thus means that continuity of control during operations other than the exposure is not a significant issue. On the other hand, as for the image blur correction in the motion image shooting, it is desirable to perform the image blur correction at all times during the shooting in which a motion image is being recorded and thus is important to continuously provide a constant performance rather than momentarily achieving a maximum performance.

JP 2002-250952 discloses the image blur correction apparatus including the two correction optical systems with the eccentricity sensitivities different from each other and configured to switch, depending on the focal length, the correction optical system to be driven. However, it does not disclose a method of keeping continuity of the control when the focal length varies due to a zooming operation or when the correction optical system is switched. Therefore, in the motion image shooting, an unnatural image motion caused by the switching of the correction optical system used for the image blur correction and a wide-blur motion image caused due to a decrease in an image blur correction performance are unavoidably recorded.

SUMMARY OF THE INVENTION

The present invention provides an image blur correction apparatus capable of appropriately driving and continuously and smoothly controlling correction optical systems and thereby of achieving a satisfactory blur correction effect even in motion image shooting, a lens apparatus, an image pickup apparatus, a method of controlling the image blur correction apparatus, and a non-transitory computer-readable storage medium.

An image blur correction apparatus as one aspect of the present invention is an image blur correction apparatus which uses a first optical correction unit and a second optical correction unit to optically correct a blur in an image and includes a vibration detection unit configured to detect vibration information of the image blur correction apparatus to output a vibration signal, a signal separation unit configured to separate the vibration signal into a first vibration signal and a second vibration signal, a first sensitivity correction unit configured to correct an amplitude of the first vibration signal, a second sensitivity correction unit configured to correct an amplitude of the second vibration signal, a first drive unit configured to drive the first optical correction unit based on an output signal from the first sensitivity correction unit, and a second drive unit configured to drive the second optical correction unit based on an output signal from the second sensitivity correction unit.

A lens apparatus as another aspect of the present invention includes the image blur correction apparatus and an image pickup optical system including the first and second correction optical systems.

An image pickup apparatus as another aspect of the present invention includes the image blur correction apparatus and an image pickup element configured to photoelectrically convert an optical image to acquire the image.

A method of controlling an image blur correction apparatus as another aspect of the present invention is a method of controlling the image blur correction apparatus which uses a first optical correction unit and a second optical correction unit to optically correct a blur in an image, and includes the steps of detecting vibration information of the image blur correction apparatus to output a vibration signal, separating the vibration signal into a first vibration signal and a second vibration signal, correcting an amplitude of the first vibration signal, correcting an amplitude of the second vibration signal, driving the first optical correction unit based on the corrected first vibration signal, and driving the second optical correction unit based on the corrected second vibration signal.

A non-transitory computer-readable storage medium as another aspect of the present invention stores a program which causes a computer to execute the method of controlling the image blur correction apparatus.

Further features and aspects of the present invention will become apparent from the following description of exemplary embodiments with reference to the attached drawings.

DESCRIPTION OF THE EMBODIMENTS

Figure 1:
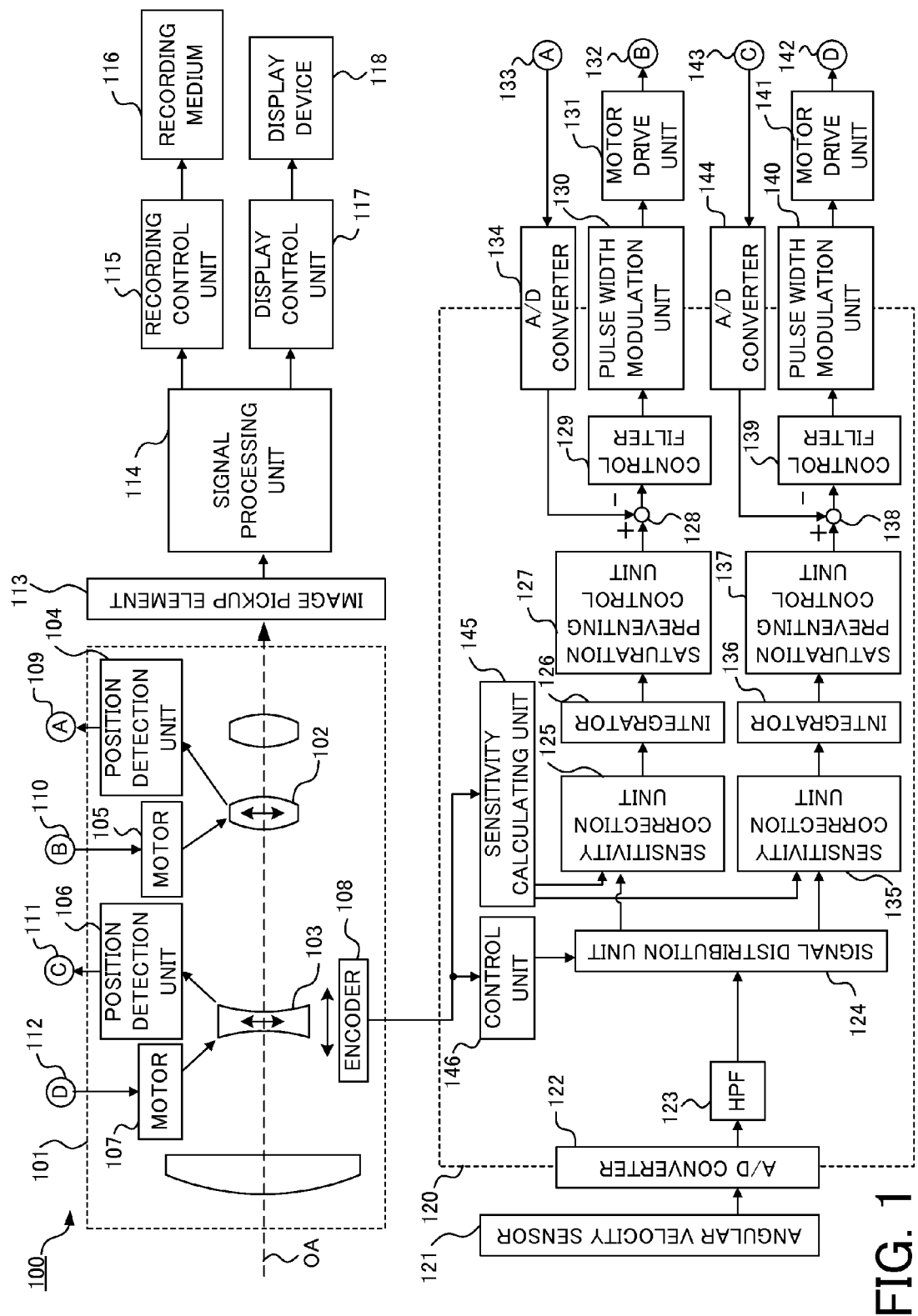
FIG. 1 is a block diagram illustrating a configuration of an image pickup apparatus (an image pickup system) in each embodiment.

Exemplary embodiments of the present invention will be described below with reference to the accompanied drawings. In each of the drawings, the same elements will be denoted by the same reference numerals and the duplicate description thereof will be omitted.

First Embodiment

First of all, referring to FIG. 1, a description will be given of a configuration of an image pickup apparatus including an image blur correction apparatus (image stabilizer) in the first embodiment of the present invention. FIG. 1 is a block diagram illustrating a configuration of an image pickup apparatus 100 in this embodiment. The image pickup apparatus 100 includes the image blur correction apparatus which uses a first optical correction unit (a shift lens 102) and a second optical correction unit (a magnification varying lens 103) to optically correct a blur in an image (a shot image). The image blur correction apparatus of this embodiment includes, at least, an angular velocity sensor 121, a microcomputer 120, and motor drive units 131 and 141.

While a digital video camera as an example of the image pickup apparatus 100 will be described in this embodiment, applications are not limited to this. This embodiment is applicable to, for example, arbitrary image pickup apparatuses having a motion image shooting function. In addition, the applications of the image pickup apparatus of this embodiment also include devices in which the image pickup apparatus is incorporated or integrated such as a mobile phone, a video game device, and a personal computer which are equipped with a camera. In this embodiment, a vibration applied to the image pickup apparatus is referred to as a "vibration" and an influence on the captured image caused by the vibration applied to the image pickup apparatus as a "blur".

While, in this embodiment, the image pickup apparatus 100 is constituted by an image pickup optical system 101 and an image pickup apparatus body which includes an image pickup element 113 integrated with each other, applicable configurations are not limited to this. This embodiment is applicable also to an image pickup apparatus (an image pickup system) including the image pickup apparatus body and a lens apparatus (an image pickup optical system 101) detachably mounted on the body. In this type of image pickup apparatus, the image blur correction apparatus is provided to the lens apparatus or the body.

In FIG. 1, the image pickup optical system 101 (the lens apparatus), which is a lens unit including a plurality of lenses, forms an optical image of an object on an imaging plane of the image pickup element 113 included in the image pickup apparatus 100. The image pickup optical system 101 includes two optical hand-shake correction mechanisms (the shift lens 102 and the magnification varying lens 103). The shift lens 102 constitutes a first optical hand-shake correction mechanism (a first correction optical system). The shift lens 102 is capable of changing an incident angle of a light beam incident on the imaging plane of the image pickup element 113 by moving in a two-dimensional plane orthogonal to a direction of an optical axis OA (an optical axis direction), i.e., a direction orthogonal to the optical axis direction. The magnification varying lens 103 constitutes a second optical hand-shake correction mechanism (a second correction optical system). The magnification varying lens 103 is capable of varying a magnification of the image pickup optical system 101 to vary a magnification of an image formed on the imaging plane of the image pickup element 113 by moving along the optical axis direction. The magnification varying lens 103 is capable of moving also in the two-dimensional plane orthogonal to the optical axis direction, i.e., the direction orthogonal to the optical axis direction, and functions also as the second optical hand-shake correction mechanism.

The image pickup element 113 includes a plurality of pixels, and photoelectrically converts the optical image formed by the image pickup optical system 101 and then supplies a pixel signal (a captured image) acquired from the plurality of pixels to a signal processing unit 114. The signal processing unit 114 performs various known signal processing such as gain control, color balance control, and γ (gamma) correction for the pixel signal output from the image pickup element 113 to convert the pixel signal into a video signal. Upon receipt of an instruction to record the video signal given by an operating unit (not illustrated) for use in giving an instruction to start or end recording, a recording control unit 115 converts the video signal from the signal processing unit 114 into that in a format suitable for recording in a recording medium 116 and then records the converted video signal in the recording medium 116. The recording medium 116 is an information recording medium such as a semiconductor memory or a magnetic recording medium such as a hard disk. A display control unit 117 outputs a video signal processed according to its use such as an image generated based on the video signal output from the signal processing unit 114 (a through-the-lens image), a setting menu image, a recorded image, and the like, and then causes the video signal to be displayed on a display device 118. The display device 118 includes a liquid crystal display element (LCD) and displays the image generated by the display control unit 117.

An angular velocity sensor 121 (a vibration detection unit) detects a vibration (vibration information) transmitted to the image pickup apparatus 100 and then outputs a vibration signal. The angular velocity sensor 121, which is constituted by, for example, a vibration gyro, detects an angular velocity of the vibration (vibration information) of the image pickup apparatus 100 caused by a hand shake or the like and then outputs an electrical signal corresponding to the angular velocity. In this embodiment, the angular velocity sensor 121 includes two angular velocity sensors such that their detection axes are vertical to each other on a plane orthogonal to the optical axis direction, for example, in a direction of a rotational axis (Yaw) in a horizontal direction and a direction of a rotational axis (Pitch) in a vertical direction. The angular velocity sensor 121 detects the angular velocity for each of the axis in the horizontal direction and the axis in the vertical direction. The microcomputer 120 (a system control unit or a control unit) described later calculates a correction amount based on each angular velocity detected by the angular velocity sensor 121 and performs drive control of the first and second correction optical systems in the direction of the rotational axis in the horizontal direction and the direction of the rotational axis in the vertical direction. Since the calculation of the correction amount and the control of each correction optical system can be performed by similar processing both on the rotational axis (Yaw) in the horizontal direction and the rotational axis (Pitch) in the vertical direction, a description will be given only of those in one of the axes.

An A/D converter 122 converts the electrical signal (an analog signal), as the vibration signal, output from the angular velocity sensor 121 into a digital signal and then outputs the digital signal to the microcomputer 120 (the system control unit). The digital signal input to the microcomputer 120 is supplied to an HPF 123 (high-pass filter) which cuts off (attenuates) a low-frequency component contained in the vibration signal and then outputs a high-frequency component of the vibration signal. Since the HPF 123 is not an essential element in this embodiment, the output from the A/D converter 122 may be directly supplied to a signal distribution unit 124.

The signal distribution unit 124 (a signal separation unit) separates the vibration signal detected by the angular velocity sensor 121 into a first separated vibration signal (a first vibration signal) and a second separated vibration signal (a second vibration signal). The first separated vibration signal is used in the blur correction by the first correction optical system. The second separated vibration signal is used in the blur correction by the second correction optical system. Since the vibration signal detected by the angular velocity sensor 121 is corrected with high accuracy by using the two correction optical systems in this embodiment, it is preferable that the first and second separated vibration signals are signals complementary to each other.

Figure 2:
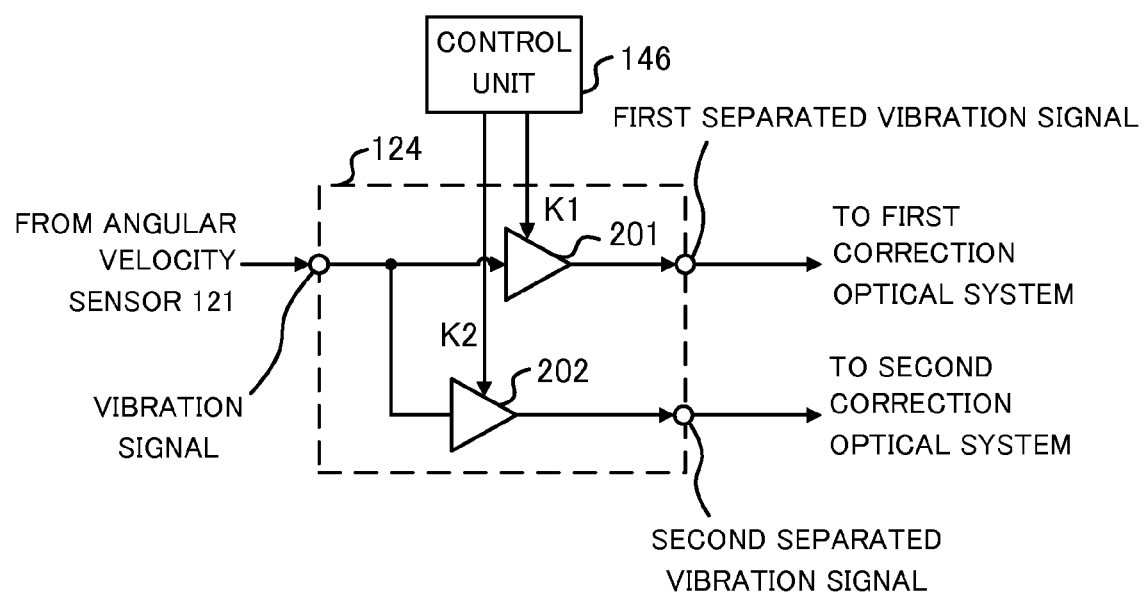
FIG. 2 is a block diagram of a signal distribution unit in a first embodiment.

Subsequently, referring to FIG. 2, a configuration of the signal distribution unit 124 will be described. FIG. 2 is a block diagram of the signal distribution unit 124. In FIG. 2, a multiplier 201 amplifies (corrects) the vibration signal detected by the angular velocity sensor 121 at a magnification K1 (a first correction value) and then outputs the amplified vibration signal as the first separated vibration signal. A multiplier 202 amplifies (corrects) the vibration signal detected by the angular velocity sensor 121 at a magnification K2 (a second correction value) and then outputs the amplified vibration signal as the second separated vibration signal. The vibration signal is separated such that the first and second separated vibration signals are signals complementary to each other. Therefore, the magnifications K1 and K2 are set so as to satisfy the following Expressions (2) and (3).

$$0 \le K1 \le 1 \quad (2)$$

$$K2 = 1 - K1 \quad (3)$$

As described above, the signal distribution unit 124 separates the vibration signal into the first and second separated vibration signals by performing a ratio calculation (a calculation using the magnifications K1 and K2) for the vibration signal. This enables highly-accurate correction even when using the two correction optical systems to correct the blur. The magnifications K1 and K2 are set by a control unit 146. The details of setting the magnifications K1 and K2 will be described later.

In FIG. 1, the first separated vibration signal and the second separated vibration signal which are separated by the signal distribution unit 124 are supplied to a sensitivity correction unit 125 (a first sensitivity correction unit) and a sensitivity correction unit 135 (a second sensitivity correction unit), respectively. The sensitivity correction unit 125 corrects an amplitude of the first separated vibration signal. The sensitivity correction unit 135 corrects an amplitude of the second separated vibration signal.

The sensitivity correction unit 125, an integrator 126, and a saturation preventing control unit 127 constitute a block for calculating a control amount (a movement amount) of the first correction optical system (the shift lens 102) based on the first separated vibration signal. Similarly, the sensitivity correction unit 135, an integrator 136, and a saturation preventing control unit 137 constitute a block for calculating a control amount (a movement amount) of the second correction optical system (the magnification varying lens 103) based on the second separated vibration signal. Since the processing by the sensitivity correction unit 125 and that by the sensitivity correction unit 135 are similar, a description will be given only of the block for calculating the control amount of the first correction optical system.

The sensitivity correction unit 125 amplifies (corrects) the first separated vibration signal such that the signal has an optimum amplitude when the first correction optical system (the shift lens 102) performs the blur correction. The amplification by the sensitivity correction unit 125 includes that at a gain of one or smaller. The first separated vibration signal amplified by the sensitivity correction unit 125 is supplied to the integrator 126.

The vibration signal detected by the angular velocity sensor 121, and the first and second separated vibration signals generated by separating the vibration signal are angular velocities. On the other hand, the control amount of the shift lens 102 and that of the magnification varying lens 103 are angular displacements. Therefore, it is necessary to time-integrate the angular velocities to convert them into angular displacements. The integrator 126 integrates the first separated vibration signal and then outputs the same. The integration is performed by the integrator 126 by incomplete integration in which a time constant can be arbitrarily changed.

The saturation preventing control unit 127 limits the control amount generated by the integrator 126 so as to prevent the first correction optical system (the shift lens 102) from contacting a mechanical movable end. The saturation preventing control unit 127 outputs, for example, as a final control amount (a drive target position), a value acquired by limiting the output from the integrator 126 such that the control amount of the first correction optical system does not exceed a predetermined value (a limit). In addition, when the output from the integrator 126 becomes close to the limit, the saturation preventing control unit 127 sets the time constant of the integrator 126 to a smaller one and controls the control amount such that the control amount decreases with the passage of time. Since the vibration signal is amplified by the sensitivity correction unit 125, the output of the saturation preventing control unit 127 is a control amount suitable in correcting the blur by using the first correction optical system.

Next, a description will be given of a block for controlling the drive of the first correction optical system (the shift lens 102). An A/D converter 134 converts an output (an analog signal) of a position detection unit 104 which detects a position of the shift lens 102 into a digital signal. A subtracter 128 subtracts data (output data of the position detection unit 104) digitalized by the AD converter 134 from the drive target position which is the output of the saturation preventing control unit 127 and then supplies deviation data which is a result of the subtraction to a control filter 129. In this configuration, a terminal A109 and a terminal A133 are electrically connected with each other.

The control filter 129 includes an amplifier which amplifies input data (the deviation data) at a predetermined gain, and a phase compensation filter. The deviation data supplied from the subtracter 128 is subjected to signal processing performed by the amplifier of the control filer 129 and the phase compensation filter, and then output to a pulse width modulation unit 130.

The pulse width modulation unit 130 modulates the digital data supplied through the control filter 129 to that with a waveform which changes a duty ratio of a pulse wave (i.e., a PWM waveform) and then supplies the modulated digital data to a motor drive unit 131. A motor 105 is a voice coil motor for driving the shift lens 102 (the first correction optical system). The motor drive unit 131 (a first drive unit) drives the motor 105, thereby moving the shift lens 102 in the direction orthogonal to the optical axis direction. As described above, the motor drive unit 131 drives the shift lens 102 (the first correction optical system) based on the output signal (a corrected first separated vibration signal) from the sensitivity correction unit 125. In this configuration, a terminal B110 and a terminal B132 are electrically connected with each other.

The position detection unit 104 includes a magnet and a Hall sensor placed at a position opposite to the magnet. The position detection unit 104 detects a movement amount of the shift lens 102 in the direction orthogonal to the optical axis direction and then supplies a result of the detection to the subtracter 128 via the A/D converter 134. This series of elements constitute a feedback control system which causes a position of the shift lens 102 in the direction orthogonal to the optical axis direction to track the drive target position which is the output of the saturation preventing control unit 127.

Next, a description will be given of a block for controlling the drive of the second correction optical system (the magnification varying lens 103). An A/D converter 144 converts an output (an analog signal) of a position detection unit 106 which detects a position of the magnification varying lens 103 into a digital signal. A subtracter 138 subtracts the data digitalized by the AD converter 144 from the drive target position which is an output of the saturation preventing control unit 137 and then supplies deviation data which is a result of the subtraction to a control filter 139. In this configuration, a terminal C111 and a terminal C143 are electrically connected with each other.

The control filter 139 includes an amplifier which amplifies input data (the deviation data) at a predetermined gain, and a phase compensation filter. The deviation data supplied from the subtracter 138 is subjected to signal processing performed by the amplifier of the control filer 139 and the phase compensation filter, and then output to a pulse width modulation unit 140.

The pulse width modulation unit 140 modulates the digital data supplied through the control filter 139 to that having a waveform which changes a duty ratio of a pulse wave (i.e., a PWM waveform) and then supplies the modulated digital data to a motor drive unit 141. A motor 107 is a voice coil motor for driving the magnification varying lens 103. The motor drive unit 141 (a second drive unit) drives the motor 107, thereby moving the magnification varying lens 103 in the direction orthogonal to the optical axis direction. As described above, the motor drive unit 141 drives the magnification varying lens 103 (the second correction optical system) based on the output signal (a corrected second separated vibration signal) from the sensitivity correction unit 135. In this configuration, a terminal D112 and a terminal D142 are electrically connected with each other.

The position detection unit 106 includes a magnet and a Hall sensor placed at a position opposite to the magnet. The position detection unit 106 detects a movement amount of the magnification varying lens 103 in the direction orthogonal to the optical axis direction and then supplies a result of the detection to the subtracter 138 via the A/D converter 144. This series of elements constitute a feedback control system which causes a position of the magnification varying lens 103 in the direction orthogonal to the optical axis direction to track the drive target position which is the output of the saturation preventing control unit 137.

As described above, driving the first and second correction optical systems based on the vibration signal detected by the angular velocity sensor 121 enables correcting the image blur caused by the vibration transmitted to the image pickup apparatus 100.

Figure 3A:
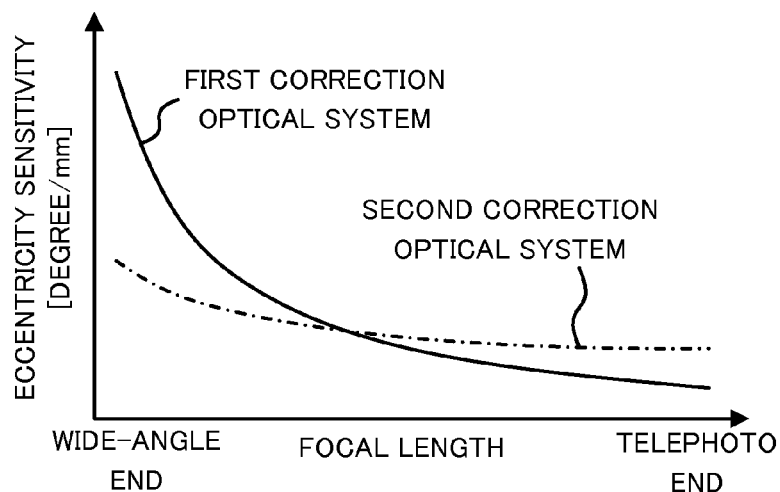
FIGS. 3A to 3C are characteristic diagrams of a first correction optical system and a second optical system in each embodiment.

In order to drive each correction optical system by an appropriate (preferably, an optimum) displacement, a sensitivity calculating unit 145 sets an amplification rate of the vibration signal corresponding to an eccentricity sensitivity of each correction optical system for each of the sensitivity correction units 125 and 135. FIG. 3A is a characteristics diagram of eccentricity sensitivities of the first and second correction optical systems. Each eccentricity sensitivity is herein expressed by a ratio between a displacement (unit: mm) of each correction optical system and a displacement (unit: degree) of an image (an image contained in a shot image) on an imaging plane (an image contain). The eccentricity sensitivity varies depending on a focal length of the image pickup optical system 101. In FIG. 3A, a horizontal axis and a vertical axis indicate the focal length and the eccentricity sensitivity (degree/mm), respectively. For instance, when the eccentricity sensitivity is large, the displacement of the image on the imaging plane is larger than that of the corresponding correction optical system, and vice versa. A description will now be given of the blur correction performed when the same magnification of vibration is transmitted to the image pickup apparatus 100. It is necessary to set the displacement of each correction optical system to small when the eccentricity sensitivity is large and to set the same to large when the eccentricity sensitivity is small. As described above, the vibration signal is amplified such that the displacement of each correction optical system is adjusted to an appropriate (preferably, an optimum) amount depending on the eccentricity sensitivity.

Figure 3B:
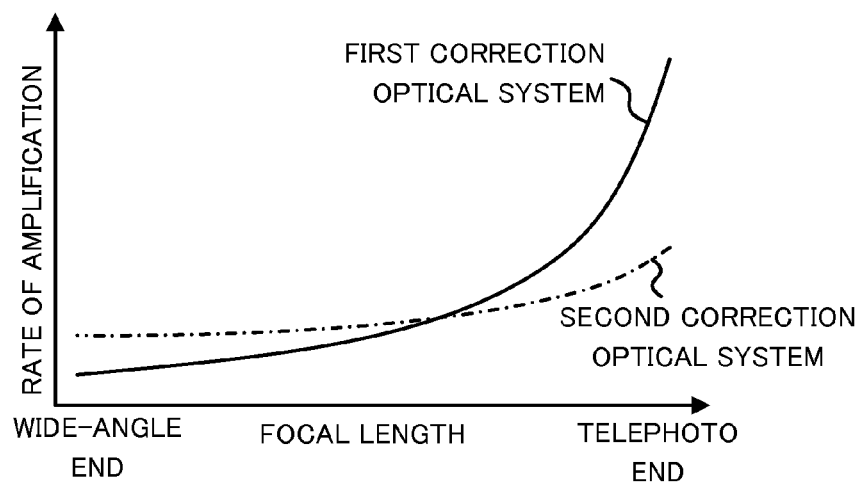

Since the eccentricity sensitivity of each correction optical system is a known value, it is possible to previously calculate amplification rates of the sensitivity correction units 125 and 135. Specifically, for example as illustrated in FIG. 3B, the focal length is determined from an encoder 108 which detects a position of the magnification varying lens 103 in the optical axis direction, with a reference table based on the focal length being previously stored. Thereafter, reading amplification data from the reference table according to the focal length enables easily achieving this calculation. It is necessary to store a large number of data in order to improve calculation accuracy. For this reason, after preparing a plurality of representative reference tables, focal length data between the stored data of the reference tables, i.e. data which is not stored in the reference tables, may be generated by performing an interpolation calculation based on the reference tables. The amplification rate calculated by the sensitivity calculating unit 145 is set for the sensitivity correction units 125 and 135. That is, the sensitivity correction unit 125 corrects the amplitude of the first separated vibration signal depending on a ratio of a displacement of an image for a displacement of the first correction optical system (the shift lens 102). Similarly, the sensitivity correction unit 135 corrects the amplitude of the second separated vibration signal depending on a ratio of a displacement of the image for a displacement of the second correction optical system (the magnification varying lens 103).

The control unit 146 (a controller) controls the signal distribution unit 124, thereby controlling a distribution, i.e., ratio, between drive of the first correction optical system and that of the second correction optical system in each focal length. As described above, the control unit 146 controls the signal distribution unit 124 such that the signal distribution unit 124 changes the first and second separated vibration signals depending on the focal length (i.e., based on the position information of the first and second correction optical systems).

Figure 3C:
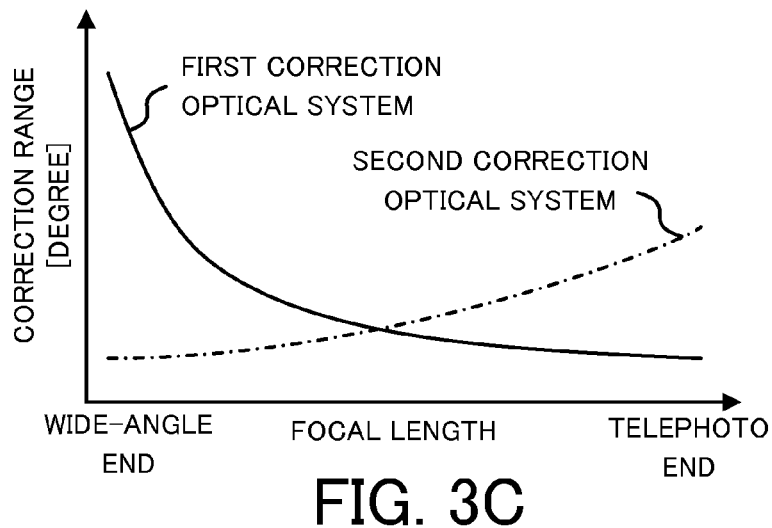

Referring to FIG. 3A, a description will now be given of distinctive characteristics observed in the first and second correction optical systems depending on the focal length. First, at a wide-angle end, the first correction optical system has a larger eccentricity sensitivity than that of the second correction optical system. Therefore, when the displacement of the first correction optical system and that of the second correction optical system are the same, the first correction optical system can ensure a larger correction angle compared to that of the second correction optical system. On the other hand, at a telephoto end, the second correction optical system has a larger eccentricity sensitivity than that of the first correction optical system. Therefore, when the displacement of the first correction optical system and that of the second correction optical system are the same, the second correction optical system can ensure a larger correction angle compared to that of the first correction optical system. Although the correction angle becomes larger with an increase in the eccentricity sensitivity, setting the displacement of each correction optical system to be larger results in a decrease in an image quality due to various aberrations and optical limitations such as an insufficient amount of a peripheral light, which may make it impossible to move each correction optical system to the mechanical movable end. To avoid this problem, each of the saturation preventing control units 127 and 137 sets an electric limiter. FIG. 3C is a graph illustrating an example of correction ranges (unit: degree) of the first and second correction optical systems in each focal length which reflect the optical limitations. As described above, the use of the first correction optical system at the wide-angle side and the second correction optical system at the telephoto side enables bringing about a sufficient blur correction effect both at the telephoto side and the wide-angle side.

Figure 4:
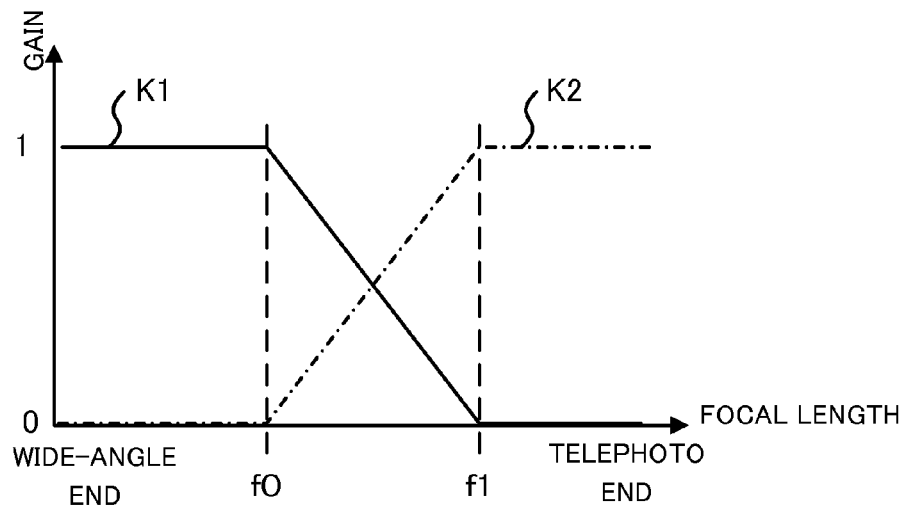
FIG. 4 is an explanatory diagram of control by a control unit in the first embodiment.

Subsequently, a description will be given of an example of the control by the control unit 146 for achieving this effect, with reference to FIG. 4. FIG. 4 is an explanatory diagram of the control by the control unit 146 and illustrates variations, depending on the focal length, of the magnifications K1 and K2 set by the signal distribution unit 124. The focal length is calculated based on a detection result of the encoder 108 which detects the position of the magnification varying lens 103 in the optical axis direction and then the magnifications K1 and K2 are set to 1 and 0, respectively, within a range in which the focal length is smaller than f0. Within a range in which the focal length is equal to or larger than f0 and smaller than f1, the magnification K1 is set so as to gradually decrease from 1 to 0 and the magnification K2 is set so as to gradually increase from 0 to 1. In this setting, the magnifications K1 and K2 are set so as to change complementarily to each other. Within a range in which the focal length is f1 or larger, the magnifications K1 and K2 are set to 0 and 1, respectively. The control in this manner enables switching the correction optical system to be driven, for example, the first correction optical system at the wide-angle side and the second correction optical system at the telephoto side and performing continuous and smooth control even when the focal length is varying due to the zooming operation.

Subsequently, a description will be given of an effect brought about by performing the correction by the sensitivity correction units 125 and 135 in this embodiment prior to the processing by the integrators 126 and 136. In order to describe the effect clearly, a case where the eccentricity sensitivity of each correction optical system is corrected based on the outputs of the integrators 126 and 136 will be described as an example. For instance, when performing the zooming operation from the wide-angle end to the telephoto end, the amplification rates of the sensitivity correction units 125 and 135 vary from small to large values as illustrated in FIG. 3B. In this situation, values acquired by multiplying the outputs of the integrators 126 and 136 by the amplification rate are displacements of the correction optical systems. Therefore, the displacement of each correction optical system increases with an increase in the focal length. In this situation, a quick zooming operation results in a sharp increase in the displacement of each correction optical system, namely, a quick movement of each correction optical system, which makes the shot image look strange. Moreover, since the displacement of the first correction optical system and that of the second correction optical system become close to the limiter of the saturation preventing control unit 127 and that of the saturation preventing control unit 137, respectively, the time constants of the integrators 126 and 136 become smaller and the vibration signal in a low-frequency band is attenuated, which results in the decrease of an effect of hand-shake correction. Furthermore, the displacements are limited by the saturation preventing control units 127 and 137, which makes it impossible to perform the blur correction.

On the other hand, in this embodiment, the eccentricity sensitivities are corrected prior to the integration processing of the vibration signal. That is, the integrator 126 (a first integration unit) integrates the output signal from the sensitivity correction unit 125. Similarly, the integrator 136 (a second integration unit) integrates the output signal from the sensitivity correction unit 135. Because of this configuration, even a sharp variation in the eccentricity sensitivity has a small influence on the displacement acquired by time-integrating the angular velocity while varying the angular velocity. This is because the integrators 126 and 136, which can be considered as LPFs, attenuate such a sharp variation in angular velocity, deeming it as a high-frequency component. This allows performing stable and satisfactory blur correction even when the zooming operation is performed.

As described above, in this embodiment, the vibration signal detected by the angular velocity sensor is separated with the signal separation unit to drive the two correction optical systems. This enables achieving a highly-accurate and satisfactory blur correction performance. In addition, the image blur correction apparatus is configured to correct the vibration signal depending on the eccentricity sensitivity of each correction optical system prior to the integration of the vibration signal. This enables performing the continuous and smooth control even when the focal length is varying, thereby achieving satisfactory blur correction.

Second Embodiment

Next, the second embodiment of the present invention will be described. Since this embodiment can be achieved with the same configuration as that of the image pickup apparatus 100 described with reference to FIG. 1, a description thereof will be omitted.

Figure 5:
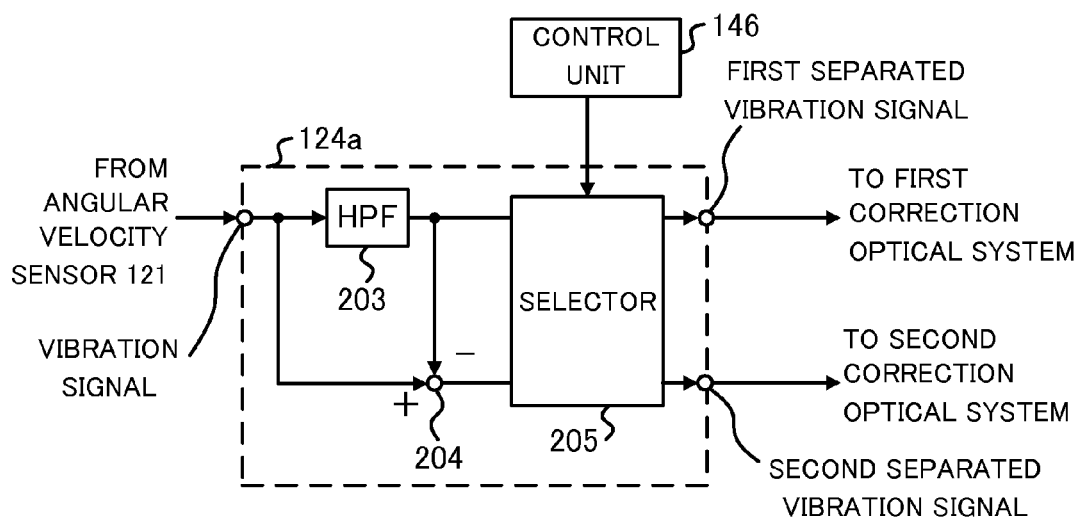
FIG. 5 is a block diagram of a signal distribution unit in a second embodiment.

Referring to FIG. 5, a signal distribution unit in this embodiment will be described. FIG. 5 is a block diagram of a signal distribution unit 124a in this embodiment. The signal distribution unit 124a in this embodiment separates a vibration signal detected by an angular velocity sensor 121 into a plurality of frequency bands different from each other (two frequency bands of a high-frequency band and a low-frequency band). That is, the signal distribution unit 124a performs a frequency-band separation calculation for the vibration signal to separate the vibration signal into a first separated vibration signal and a second separated vibration signal. Thereafter, the signal distribution unit 124a outputs two vibration signals corresponding to the two separated frequency bands and controls two correction optical systems (a first correction optical system and a second correction optical system). In addition, the signal distribution unit 124a is configured to be capable of switching the first and second separated vibration signals as outputs of the high-frequency component and the low-frequency component depending on a signal supplied from a control unit 146.

In FIG. 5, from the vibration signal detected by the angular velocity sensor 121, only its high-frequency band signal (a high-frequency component) is extracted by an HPF 203 and then supplied to a selector 205 and a subtracter 204. The subtracter 204 subtracts the high-frequency component which has passed through the HPF 203 from the original vibration signal to generate a low-frequency component contained in the original vibration signal and then supplies the low-frequency component to the selector 205. This configuration makes the vibration signal at the high-frequency band and the vibration signal at the low-frequency band complementary to each other. This allows completely correcting the frequency band of the original vibration signal even when correcting the same by using the two correction optical systems. An LPF (Low-pass filter) may be used instead of the HPF 203. In this case, it is possible to cause a low-frequency component to pass through the LPF as one output and then to subtract the low-frequency component from an original vibration signal to generate a high-frequency component as the other output.

The selector 205 switches a combination of output signals depending on the control signal output from the control unit 146. Specifically, the selector 205 switches an output which is a combination of the first separated vibration signal as the high-frequency component and the second separated vibration signal as the low-frequency component and an output which is a combination of the first separated vibration signal as the low-frequency component and the second separated vibration signal as the high-frequency component. That is, the signal distribution unit 124a separates the vibration signal into a vibration signal with a first frequency band (the high-frequency component) and a vibration signal with a second frequency band (the low-frequency component) lower than the first frequency band. Thereafter, the signal distribution unit 124a (the selector 205) sets each of the vibration signal with the first frequency band and the vibration signal with the second frequency band as one of the first separated vibration signal and the second separated vibration signal based on position information of the first correction optical system or the second correction optical system. As described above, the signal distribution unit 124a is capable of separating the vibration signal into the high-frequency component and the low-frequency component and switching, as their output, the first correction optical system and the second correction optical system.

Next, control by the control unit 146 in this embodiment will be described. In general, a frequency component of a vibration caused by a hand-shake has a large amplitude at the low-frequency band and a smaller amplitude at a higher frequency band. Therefore, when separating a vibration signal at frequency bands different from each other and performing the blur correction with two correction optical systems, it is preferable to use a correction optical system with a larger correction range in correcting a blur of a low-frequency component. This enables efficiently driving the two correction optical systems, thereby making it possible to achieve a satisfactory blur correction effect.

On the other hand, as for correction ranges of the first and second correction optical systems, the first correction optical system has a broader correction range at a wide-angle side and the second correction optical system has a broader correction range at a telephoto side as described in the first embodiment. That is, performing the control so as to switch the correction optical system which corrects the vibration signal at the low-frequency band to the correction optical system with a broader correction range depending on the focal length enables bringing about a higher blur correction effect both at the telephoto side and the wide-angle side.

Figure 6:
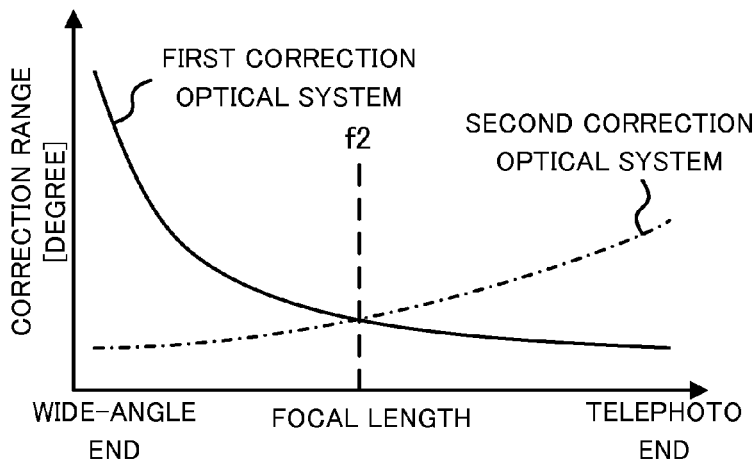
FIG. 6 is an explanatory diagram of the control by the control unit in the second embodiment.

FIG. 6 is an explanatory diagram of the control by the control unit 146 and also a graph illustrating the correction ranges (unit: degree) of the first and second correction optical systems corresponding to the focal length which reflect optical limitations. In FIG. 6, symbol f2 denotes the focal length at which the correction range of the first correction optical system and that of the second correction optical system intersect with each other. In this embodiment, the control unit 146 controls the signal distribution unit 124a such that the low-frequency component is allocated to the first correction optical system within a range in which the focal length is shorter than f2. Similarly, the control unit 146 controls the signal distribution unit 124a such that the low-frequency component is allocated to the second correction optical system within a range in which the focal length is equal to or longer than f2.

Figure 7:
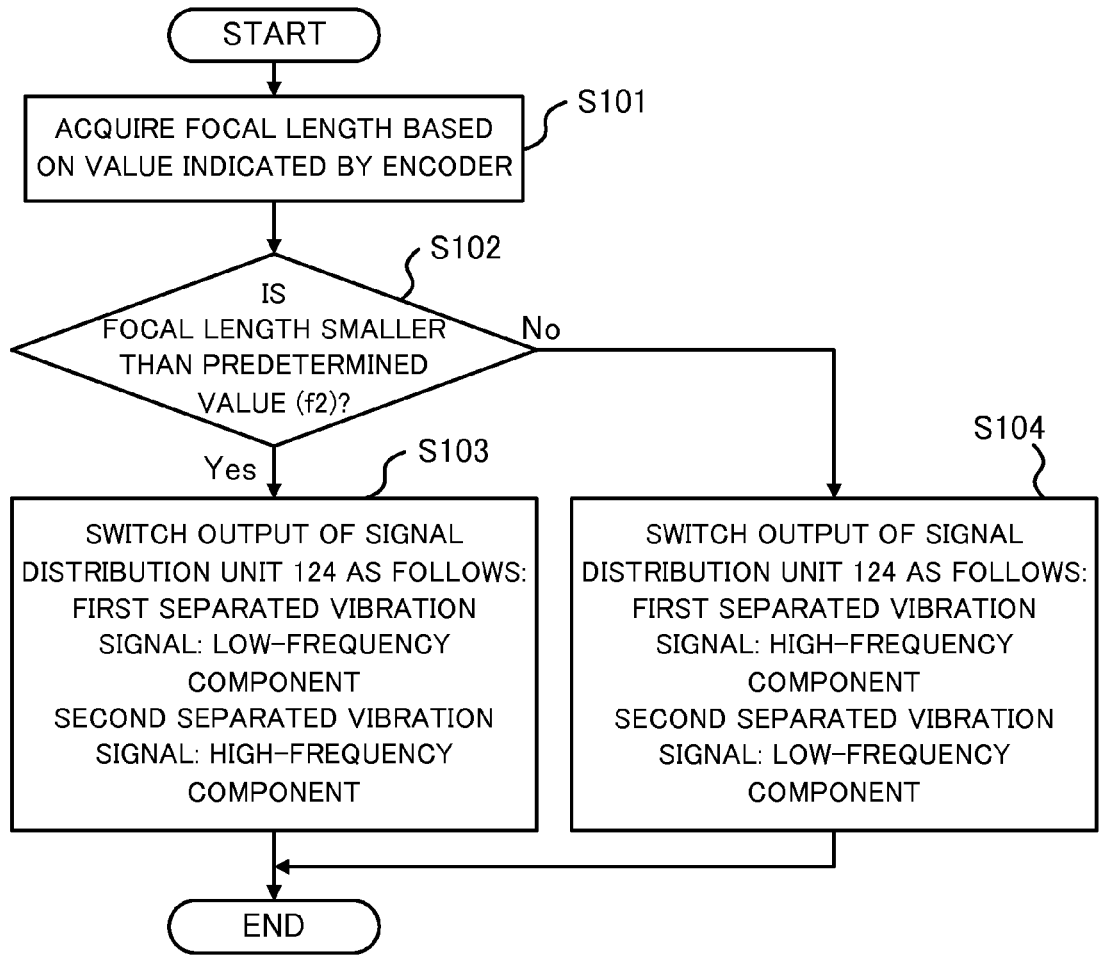
FIG. 7 is a flowchart illustrating the control by the control unit in the second embodiment.

FIG. 7 is a flowchart of the control by the control unit 146 and illustrates an example of a series of operations ending with switching of the selector 205 of the signal distribution unit 124a by the control unit 146. Processing illustrated in FIG. 7 is repeatedly performed at an arbitrary predetermined period, for example, at 60 Hz which is a period of capturing one frame image in the image pickup apparatus 100.

First, at step S101, the control unit 146 calculates the focal length of the image pickup optical system 101 by using an output signal of the encoder 108. Subsequently, at step S102, the control unit 146 determines whether or not the focal length calculated at step S101 has a value located close to the wide-angle side than a predetermined value (the focal length f2). The flow proceeds to step S103 when the calculated focal length has the value located at the wide-angle side (when the calculated focal length is smaller than the focal length f2). On the other hand, the flow proceeds to step S104 when the calculated focal length does not have a value located at the wide-angle side (when the calculated focal length is equal to or larger than the focal length f1).

Subsequently, at step S103, the control unit 146 controls the selector 205 of the signal distribution unit 124a such that the selector 205 outputs the high-frequency component as the second separated vibration signal and the low-frequency component as the first separated vibration signal. Similarly, at step S104, the control unit 146 controls the selector 205 of the signal distribution unit 124a such that the selector 205 outputs the high-frequency component as the first separated vibration signal and the low-frequency component as the second separated vibration signal.

As described above, in this embodiment, the vibration signal detected by the angular velocity sensor is separated into a plurality of frequency bands different from each other to drive the two correction optical systems. In addition, the output of the vibration signal is switched depending on the focal length so as to correct the low-frequency component of the vibration signal by using the correction optical system having a broader correction range. This enables bringing about a higher blur correction effect both at the telephoto side and the wide-angle side.

In this embodiment, the signal processing is performed in order of the separation of the vibration signal and the switching of the output of the vibration signal, the correction of an eccentricity sensitivity, and integration processing. This leads to the following effect. First, the separation of the vibration signal and the switching of the output of the vibration signal are performed prior to the correction of the eccentricity sensitivity. This enables switching the vibration signal irrespectively of which correction optical system is being used or of an amplification rate of the vibration signal which varies depending on the focal length, which makes it possible to reduce a signal difference caused by the switching. Moreover, since the control unit 146 is configured to correct the eccentricity sensitivity prior to the integration processing, the signal difference caused by the switching of the vibration signal or a signal variation caused by a sharp change in the eccentricity sensitivity has a small influence on a control amount of each correction optical system after the integration processing. This allows performing continuous and smooth control even in a state in which the focal length is varying or even when the vibration signal of the correction optical system is switched depending on the focal length, which enables the satisfactory blur correction.

Third Embodiment

Next, the third embodiment of the present invention will be described. In the first and second embodiments, the vibration signal of the image pickup apparatus 100 detected by the angular velocity sensor 121 is separated into the two signals and the two correction optical systems are then controlled based on the two signals to perform the hand-shake correction. On the other hand, in this embodiment, one of the correction optical systems is driven based on a signal different from information on the vibration of the image pickup apparatus 100.

The signal different from the information on the vibration of the image pickup apparatus 100 is, for example, a drive signal for tracking-controlling a position of a face of a person (an object) detected from a captured image such that the position is located near a center of a screen. The control is performed with one of the correction optical systems so as to track the position of the face of the person (the object), with the other performing the hand-shake correction.

Figure 8:
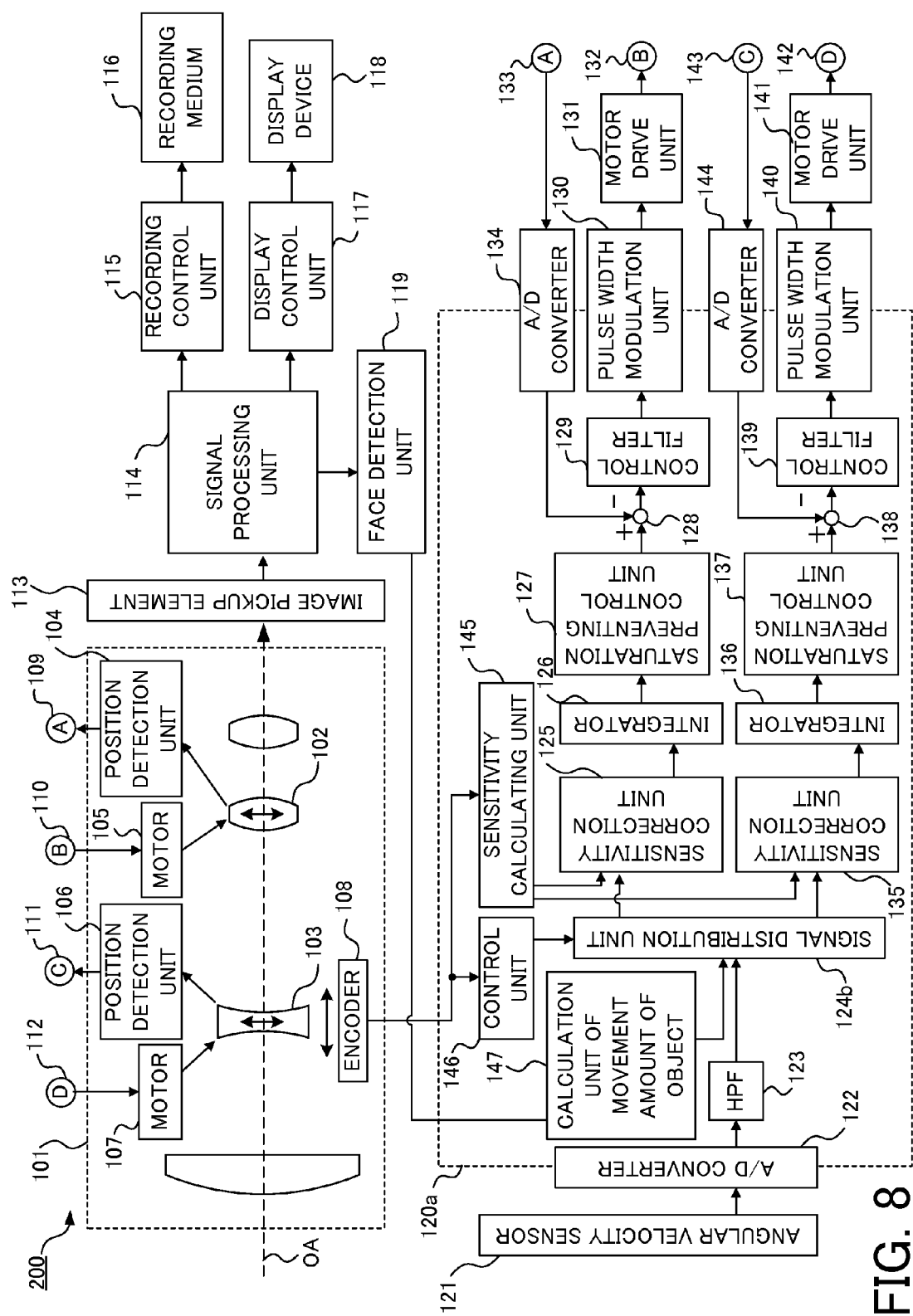
FIG. 8 is a block diagram illustrating a configuration of an image pickup apparatus in a third embodiment.

FIG. 8 is a block diagram illustrating a configuration of an image pickup apparatus 200 (a digital video camera) in this embodiment. In FIG. 8, the same elements will be denoted by the same reference numerals and the duplicate description thereof will be omitted. In addition to the elements illustrated in FIG. 1, the image pickup apparatus 200 illustrated in FIG. 8 is provided with a face detection unit 119 which detects the face of the person from a video signal and a tracking control unit 147 (a calculation unit of a movement amount of an object) which calculates a drive amount of each correction optical system based on an output signal of the face detection unit 119. The tracking control unit 147 is a signal generation unit which outputs a predetermined signal to a signal distribution unit 124b based on the information acquired from the shot image. The information acquired from the shot image is, for example, the position or the movement amount of the object. As described above, in addition to the vibration signal detected by the angular velocity sensor 121, the output signal of the tracking control unit 147 is supplied to the signal distribution unit 124b.

The face detection unit 119 performs known face-detection processing for the video signal generated by the signal processing unit 114 and detects the face of the person in the shot image. As information generated by the face detection unit 119, coordinate information indicating a position of a face region, a size of the face, an evaluation value concerning a certainty of the face, and the like are generated. The face detection unit 119 supplies this series of information (a detection result) to the tracking control unit 147.

The tracking control unit 147 determines the face region which is considered to be a main object, based on the information generated by the face detection unit 119 such as the size of the face and the certainty of the face and then extracts coordinates of the face region. Thereafter, the tracking control unit 147 calculates a movement amount required to track the object, based on the extracted coordinate information. The operation to detect the face of the person is performed by the face detection unit 119 at a period at which a frame rate of the video signal is the minimum. On the other hand, the detection of the vibration signal by the angular velocity sensor 121 and the control for driving each correction optical system are performed at a period shorter than the frame rate, for example, at a period of 1 msec. Therefore, the face detection unit 119 calculates a movement amount per 1 msec, namely, movement velocity data based on the movement amount of the face and then supplies the data to the signal distribution unit 124b. In this embodiment, the output signal of the signal distribution unit 124b is referred to as a "tracking drive signal".

Figure 9:
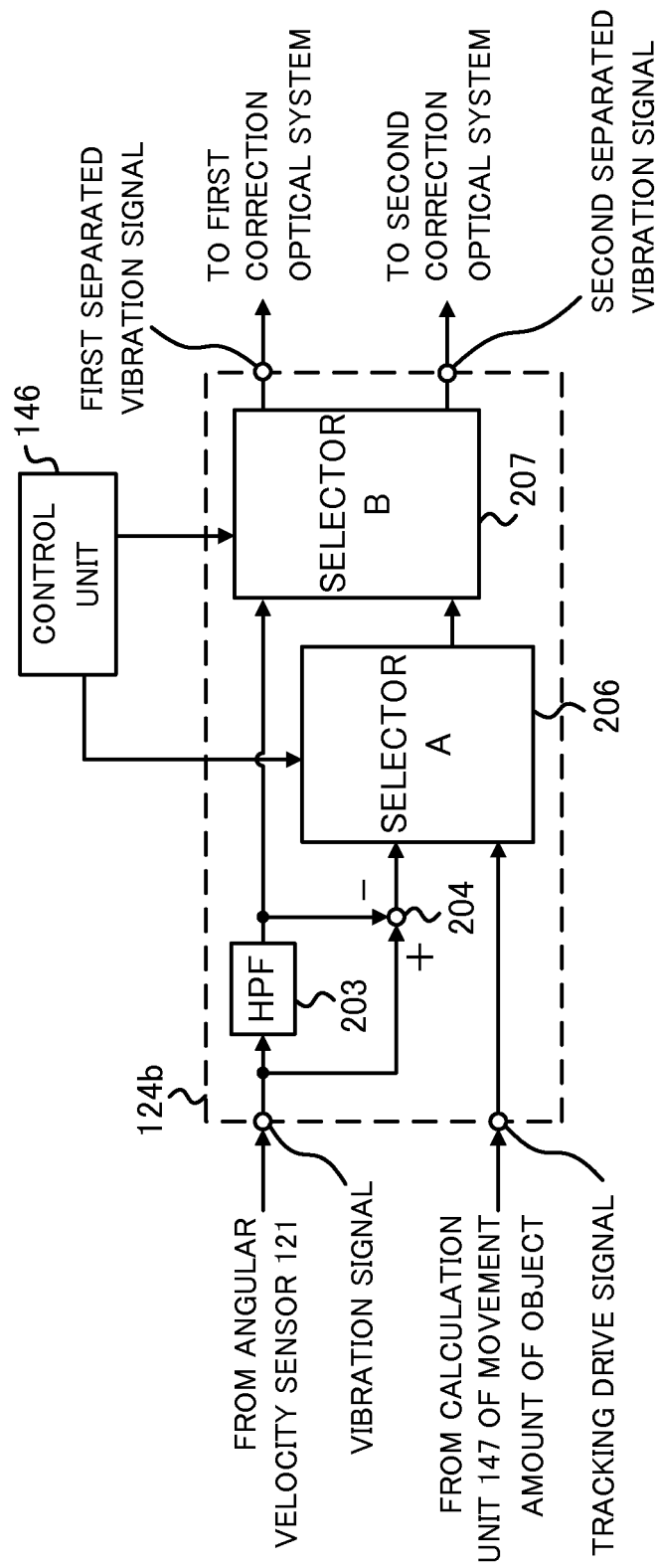
FIG. 9 is a block diagram of a signal distribution unit in the third embodiment.

FIG. 9 is a block diagram of the signal distribution unit 124b in this embodiment. In FIG. 9, from the vibration signal detected by the angular velocity sensor 121, only its signal within high-frequency band is extracted by the HPF 203 and then supplied to a selector B 207 and the subtracter 204. The subtracter 204 subtracts a high-frequency component which has passed through the HPF 203 from the original vibration signal to generate a low-frequency component contained the original vibration signal. The low-frequency component generated by the subtracter 204 is supplied to a selector A 206. In addition, the tracking drive signal which is the output signal of the tracking control unit 147 is supplied to the selector A 206. The selector A 206 is configured to select and output either one of the low-frequency component of the vibration signal or the tracking drive signal based on a control signal from the control unit 146.

The selector B 207 switches a combination of the output signals according to the control signal from the control unit 146. Specifically, the selector B 207 outputs a combination of the high-frequency component of the vibration signal as a first separated vibration signal and the output of the selector A 206 as a second separated vibration signal. Otherwise, the selector B 207 outputs a combination of the output of the selector A 206 as the first separated vibration signal and the high-frequency component of the vibration signal as the second separated vibration signal. As described above, the selector B 207 is capable of switching the two combinations.

Next, the control by the control unit 146 in this embodiment will be described. As described above, the frequency component of the vibration caused by the hand shake has the large amplitude at the low-frequency band and the smaller amplitude at the higher-frequency band. In addition, if a larger amount of blur containing the high-frequency component remains compared to that containing the low-frequency component in motion image shooting, a user tends to have a discomfort. Therefore, one of the two correction optical systems is used to correct the high-frequency component of the vibration signal at all times, with the other being controlled such that the other selects and corrects either one of the tracking drive signal or the low-frequency component of the vibration signal. In addition, the correction optical system with a narrower correction range corrects the high-frequency component of the vibration signal because the high-frequency component has a relatively-small amplitude, and the correction optical system with a broader correction range is driven according to the tracking drive signal or the low-frequency component of the vibration signal.

As described in the second embodiment, the correction ranges of the first and second correction optical systems with respect to the focal length have characteristics illustrated in FIG. 6. That is, the first correction optical system has the larger correction range at the wide-angle side and the second correction optical system has the larger correction range at the telephoto side. For this reason, the control unit 146 controls the signal distribution unit 124*b* such that the signal distribution unit 124*b* switches the signal component used for controlling the first and second correction optical systems within a range in which the focal length illustrated in FIG. 6 is shorter than f2 and within a range in which the focal length is equal to or longer than f2.

Figure 10:
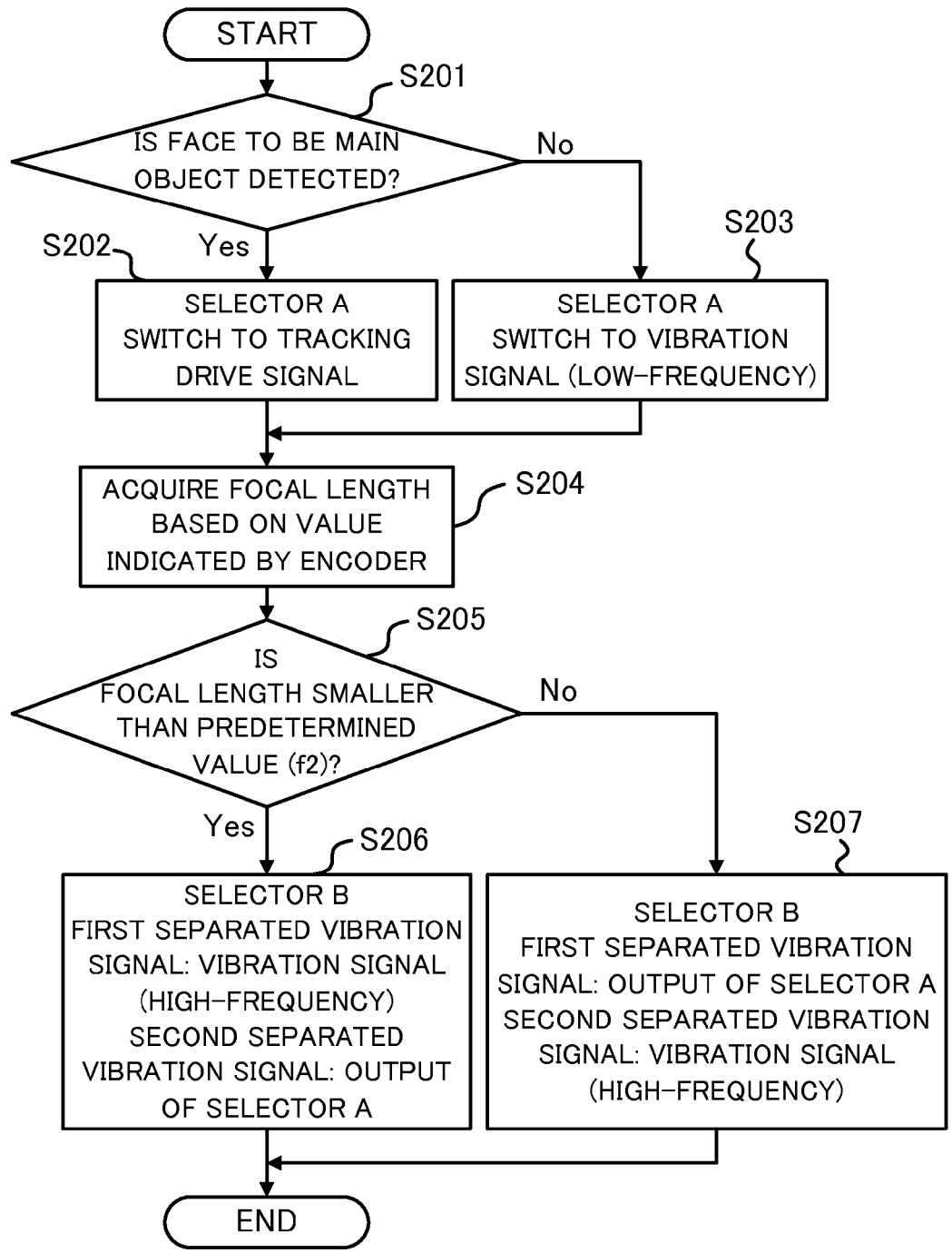
FIG. 10 is a flowchart illustrating the control by the control unit in the third embodiment.

FIG. 10 is a flowchart illustrating a series of operations ending with switching of the signal distribution unit 124*b* by the control unit 146. Processing illustrated in FIG. 10 is repeatedly performed at an arbitrary predetermined period, for example, at 60 Hz which is a period of capturing one frame of an image in the image pickup apparatus 100.

First, at step S201, the face detection unit 119 determines whether or not a face to be a main object is detected. Even when a face is detected, the face detection unit 119 determines that the face to be the main object is not detected if the size of the face is smaller than a predetermined size or if the certainty of the face is lower than a predetermined threshold. The flow proceeds to step S202 when the face to be the main object is detected. On the other hand, the flow proceeds to step S203 when the face to be the main object is not detected. At step S202, the control unit 146 controls the selector A 206 such that the selector A 206 selects, of the tracking drive signal and the low-frequency component of the vibration signal, the tracking drive signal. On the other hand, at step S203, the control unit 146 controls the selector A 206 such that the selector A 206 selects the low-frequency component of the vibration signal.

Subsequently, at step S204, the control unit 146 calculates the focal length of the image pickup optical system 101 based on the output signal of the encoder 108. Thereafter, at step S205, the control unit 146 determines whether or not the calculated focal length has a value located closer to the wide-angle side than a predetermined value (whether or not the focal length is smaller than f2). When the calculated focal length has the value located closer to the wide-angle side than the predetermined value, the flow proceeds to step S206. On the other hand, when the calculated focal length does not have the value located closer to the wide-angle side than the predetermined value, the flow proceeds to step S207. At step S206, the control unit 146 controls the selector B 207 such that the selector B 207 selects the output signal of the selector A 206 as the first separated vibration signal and the high-frequency component of the vibration as the second separated vibration signal. On the other hand, at step S207, the control unit 146 controls the selector B 207 such that the selector B 207 selects the high-frequency component of the vibration as the first separated vibration signal and the output signal of the selector A 206 as the second separated vibration signal.

As described above, in this embodiment, the two correction optical systems are driven based on the signal different from the information on the vibration in addition to the vibration signal detected by the angular velocity sensor. For instance, the two correction optical systems are controlled such that one of them is used to track the position of the face of the person with the other performing the hand-shake correction. Moreover, switching the signal used for controlling the correction optical systems depending on the focal length enables bringing about a high blur correction effect and performing the tracking control of the person object at the same time.

In addition, the output signal and the vibration signal of the tracking control unit 147 are switched prior to the correction of the eccentricity sensitivity. This allows treating the output signal and the vibration signal of the tracking control unit 147 as signals with the same unit, which makes it possible to decrease a signal difference caused by the switching. The eccentricity sensitivity is corrected prior to the integration processing. This enables reducing an influence caused by the signal difference caused by the switching of the vibration signal or a variation in the signal due to a sharp variation in the eccentricity sensitivity on a control amount of each correction optical system after the integration processing. This allows performing continuous and smooth control even in a state in which the focal length is varying or even when the vibration signal of each correction optical system is switched, which makes it possible to achieve satisfactory blur correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While, in each of the embodiments, the angular velocity of the vibration is detected by using the angular velocity sensor and the displacement of each correction optical system is calculated by performing the integration processing, other type of vibration detection unit may alternatively be used. For instance, the image blur correction apparatus may be configured to detect an acceleration of the vibration by using an acceleration sensor and to calculate the displacement of each correction optical system by performing a second-order integration.

While, in each of the embodiments, part of lens units of the image pickup optical system as an example of the correction optical system is moved in the two-dimensional plane orthogonal to the optical axis direction to correct the blur in the shot image, the present invention is not limited to this. The image blur correction apparatus may be configured to drive, for example, a variable angle prism (VAP) and the image pickup element in a direction orthogonal to the optical axis direction. Alternatively, these configurations may be combined.

While, in each of the embodiments, the vibration signal is separated into two signals and the two correction optical systems are used to correct the blur, the present invention is not limited to this. The image blur correction apparatus may alternatively be configured to separate the vibration signal into three or more signals and to then drive three or more correction optical systems to correct the blur.

According to each of the embodiments, it is possible to provide an image blur correction apparatus capable of appropriately driving and continuously and smoothly controlling correction optical systems and thereby of achieving a satisfactory blur correction effect even in motion image shooting, a lens apparatus, an image pickup apparatus, a method of controlling the image blur correction apparatus, and a non-transitory computer-readable storage medium.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-211620, filed on Oct. 9, 2013, which is hereby incorporated by reference herein in its entirety.

What is claimed is:

1. An image blur correction apparatus which uses a first optical correction unit and a second optical correction unit to optically correct a blur in an image, wherein an image pickup optical system configured to vary a magnification of an image comprises the first optical correction unit and the second optical correction unit, the image blur correction apparatus comprising:
at least one processor or circuit configured to perform the operations of the following units:
(a) a vibration detection unit configured to detect vibration information of the image blur correction apparatus to output a vibration signal;
(b) a signal separation unit configured to separate the vibration signal into a first vibration signal and a second vibration signal;
(c) a first sensitivity correction unit configured to correct an amplitude of the first vibration signal depending on an eccentricity sensitivity of the first optical correction unit, the eccentricity sensitivity of the first optical correction unit varying depending on a focal length;
(d) a second sensitivity correction unit configured to correct an amplitude of the second vibration signal depending on an eccentricity sensitivity of the second optical correction unit, the eccentricity sensitivity of the second optical correction unit varying depending on a focal length;
(e) a first integration unit configured to integrate an output signal from the first sensitivity correction unit; and
(f) a second integration unit configured to integrate an output signal from the second sensitivity correction unit,
(g) a first drive unit configured to drive the first optical correction unit based on the integrated signal from the first integration unit; and
(h) a second drive unit configured to drive the second optical correction unit based on the integrated signal from the second integration unit.

2. The image blur correction apparatus according to claim 1, wherein the vibration information is at least one of a velocity and an acceleration of a vibration applied to the image blur correction apparatus.

3. The image blur correction apparatus according to claim 1, wherein the first sensitivity correction unit is configured to correct the amplitude of the first vibration signal depending on a ratio of a displacement of an image for a displacement of the first optical correction unit, and
wherein the second sensitivity correction unit is configured to correct the amplitude of the second vibration signal depending on a ratio of a displacement of the image for a displacement of the second optical correction unit.

4. The image blur correction apparatus according to claim 1, wherein the signal separation unit is configured to perform a ratio calculation for the vibration signal to separate the vibration signal into the first and second vibration signals.

5. The image blur correction apparatus according to claim 1, wherein the signal separation unit is configured to perform a frequency-band separation calculation for the vibration signal to separate the vibration signal into the first and second vibration signals.

6. The image blur correction apparatus according to claim 5, wherein the signal separation unit is configured to:
separate the vibration signal into a vibration signal with a first frequency band and a vibration signal with a second frequency band lower than the first frequency band, and
set the vibration signal with the first frequency band and the vibration signal with the second frequency band to one of the first vibration signal and the second vibration signal based on position information of at least one of the first optical correction unit and the second optical correction unit.

7. The image blur correction apparatus according to claim 1, wherein the at least one processor or circuit is further configured to perform the operation of the following unit:
a control unit configured to control the signal separation unit,
wherein the control unit is configured to control the signal separation unit such that the signal separation unit changes the first and second vibration signals based on position information of at least one of the first optical correction unit and the second optical correction unit.

8. The image blur correction apparatus according to claim 7, wherein the control unit is configured to control the signal separation unit such that the signal separation unit changes the first and second vibration signals based on a focal length.

9. The image blur correction apparatus according to claim 1, further comprising a signal generation unit configured to output a predetermined signal to the signal separation unit based on information acquired from the image.

10. The image blur correction apparatus according to claim 9, wherein the information acquired from the image is at least one of a position and a movement amount of an object.

11. The image blur correction apparatus according to claim 1, wherein the first optical correction unit is a shift lens, and
wherein the second optical correction unit is a magnification varying lens.

12. A lens apparatus comprising:
an image blur correction apparatus configured to use a first optical correction unit and a second optical correction unit to optically correct a blur in an image; and
an image pickup optical system configured to vary a magnification of an image, the image pickup optical system including the first and second optical correction units,
wherein the image blur correction apparatus includes:
at least one processor or circuit configured to perform the operations of the following units:
(a) a vibration detection unit configured to detect vibration information of the image blur correction apparatus to output a vibration signal;
(b) a signal separation unit configured to separate the vibration signal into a first vibration signal and a second vibration signal;
(c) a first sensitivity correction unit configured to correct an amplitude of the first vibration signal depending on an eccentricity sensitivity of the first optical correction unit, the eccentricity sensitivity of the first optical correction unit varying depending on a focal length;
(d) a second sensitivity correction unit configured to correct an amplitude of the second vibration signal depending on an eccentricity sensitivity of the second optical correction unit, the eccentricity sensitivity of the second optical correction unit varying depending on a focal length;
(e) a first integration unit configured to integrate an output signal from the first sensitivity correction unit; and
(f) a second integration unit configured to integrate an output signal from the second sensitivity correction unit,
(g) a first drive unit configured to drive the first optical correction unit based on the integrated signal from the first integration unit; and (h) a second drive unit configured to drive the second optical correction unit based on the integrated signal from the second integration unit.

13. An image pickup apparatus comprising:
an image blur correction apparatus configured to use a first optical correction unit and a second optical correction unit to optically correct a blur in an image, wherein an image pickup optical system configured to vary a magnification of an image comprises the first optical correction unit and the second optical correction unit; and
an image pickup element configured to photoelectrically convert an optical image to acquire the image,
wherein the image blur correction apparatus includes:
at least one processor or circuit configured to perform the operations of the following units:
(a) a vibration detection unit configured to detect vibration information of the image blur correction apparatus to output a vibration signal;
(b) a signal separation unit configured to separate the vibration signal into a first vibration signal and a second vibration signal;
(c) a first sensitivity correction unit configured to correct an amplitude of the first vibration signal depending on an eccentricity sensitivity of the first optical correction unit, the eccentricity sensitivity of the first optical unit varying depending on a focal length;
(d) a second sensitivity correction unit configured to correct an amplitude of the second vibration signal depending on an eccentricity sensitivity of the second optical correction unit, the eccentricity sensitivity of the second optical correction unit varying depending on a focal length;
(e) a first integration unit configured to integrate an output signal from the first sensitivity correction unit and a second integration unit configured to integrate an output signal from the second sensitivity correction unit,
(f) a first drive unit configured to drive the first optical correction unit based on aft the integrated signal from the first integration unit; and
(g) a second drive unit configured to drive the second optical correction unit based on the integrated signal from the second integration unit.

14. A method of controlling an image blur correction apparatus which uses a first optical correction unit and a second optical correction unit to optically correct a blur in an image, wherein an image pickup optical system configured to vary a magnification of an image comprises the first optical correction unit and the second optical correction unit, the method comprising the steps of:
(a) detecting vibration information of the image blur correction apparatus to output a vibration signal;
(b) separating the vibration signal into a first vibration signal and a second vibration signal;
(c) correcting an amplitude of the first vibration signal depending on an eccentricity sensitivity of the first optical correction unit, the eccentricity sensitivity of the first optical correction unit varying depending on a focal length;
(d) correcting an amplitude of the second vibration signal depending on an eccentricity sensitivity of the second optical correction unit, the eccentricity sensitivity of the second optical correction unit varying depending on a focal length;
(e) integrating the corrected first vibration signal; and
(f) integrating the corrected second vibration signal, (g) driving the first optical correction unit based on the integrated corrected first vibration signal; and
(h) driving the second optical correction unit based on the integrated corrected second vibration signal.

15. A non-transitory computer-readable storage medium which causes a computer to execute a process of controlling an image blur correction apparatus which uses a first optical correction unit and a second optical correction unit to optically correct a blur in an image, wherein an image pickup optical system configured to vary a magnification of an image comprises the first optical correction unit and the second optical correction unit, the process comprising the steps of:
(a) detecting vibration information of the image blur correction apparatus to output a vibration signal;
(b) separating the vibration signal into a first vibration signal and a second vibration signal;
(c) correcting an amplitude of the first vibration signal depending on an eccentricity sensitivity of a first optical correction unit, the eccentricity sensitivity of the first optical correction unit varying depending on a focal length;
(d) correcting an amplitude of the second vibration signal depending on an eccentricity sensitivity of a second optical correction unit, the eccentricity sensitivity of the second optical correction unit varying depending on a focal length;
(e) integrating the corrected first vibration signal; and
(f) integrating the corrected second vibration signal,
(g) driving the first optical correction unit based on the integrated corrected first vibration signal; and
(h) driving the second optical correction unit based on the integrated corrected second vibration signal.

16. An image blur correction apparatus which uses a first optical correction unit and a second optical correction unit to optically correct a blur in an image, the image blur correction apparatus comprising:
at least one processor or circuit configured to perform the operations of the following units:
(a) a vibration detection unit configured to detect vibration information of the image blur correction apparatus to output a vibration signal; and
(b) a signal separation unit configured to separate the vibration signal into a first vibration signal and a second vibration signal,
wherein the signal separation unit (1) amplifies the vibration signal at a first correction value K1 to output the amplified vibration signal as the first vibration signal and (2) amplifies the vibration signal at a second correction value K2 to output the amplified vibration signal as the second vibration signal, and
wherein the first correction value K1 and the second correction value K2 are set so as to satisfy the following expressions:

$0 \leq K1 \leq 1$ $K2=1-K1.$

17. The image blur correction apparatus according to claim 16, wherein at a wide-angle end, the first correction optical unit has a larger eccentricity sensitivity than that of the second correction optical unit,
wherein at a telephoto end, the second correction optical unit has a larger eccentricity sensitivity than that of the first correction optical unit,
wherein at the wide-angle end, the first correction value K1 is larger than the second correction value K2, and
wherein at the telephoto end, the second correction value K2 is larger than the first correction value K1.

18. A method of controlling an image blur correction apparatus which uses a first optical correction unit and a second optical correction unit to optically correct a blur in an image, the method comprising the steps of:
detecting vibration information of the image blur correction apparatus to output a vibration signal; and
separating the vibration signal into a first vibration signal and a second vibration signal,
wherein the vibration signal is amplified at a first correction value K1 to be output as the first vibration signal, and the vibration signal is amplified at a second correction value K2 to be output as the second vibration signal, and
wherein the first correction value K1 and the second correction value K2 are set so as to satisfy the following expressions:

$0 \leq K1 \leq 1$ $K2=1-K1.$

* * * * *